Patented Oct. 5, 1954

2,691,004

UNITED STATES PATENT OFFICE 2,691,004

OIL-MODIFIED ACIDIC POLYESTER-ETHOXYLINE RESINOUS COMPOSITIONS

Charles D. Doyle, Schenectady, N. Y., assignor to General Electric Company, a corporation of New York No Drawing. Application October 31, 1951,
Serial No. 254,213

7 Claims. (Cl. 260—22)

This invention is concerned with novel resinous compositions of matter. More particularly the invention relates to a composition of matter comprising the product of reaction of a mixture of ingredients comprising (1) an ethoxyline resin and (2) an oil-modified acidic polyester having from 1 to 2 free carboxyl groups per molecule and obtained by effecting reaction between (a) a trihydric alcohol ester of a long-chain fatty acid containing at least two unesterified alcoholic hydroxyl groups and (b) a dicarboxylic acid.

It has been disclosed in U. S. Patent 2,324,483—Castan, that epoxy resins comprising the product of reaction of a phenol having at least two phenolic hydroxy groups and an epihalogenohydrin, e. g., epichlorohydrin, in which the said product contains at least two ethylene oxide groups, may be converted to the substantially thermoset stage by employing a polybasic carboxylic acid or anhydride, for instance, phthalic acid or anhydride, as a cure accelerator. The resinous reaction products in which the polybasic carboxylic acid anhydride is employed are generally complex resins comprising a polyether derivative of a polyhydric phenol containing epoxy groups and are commonly known as "ethoxyline resins" and are sold under the trade names of Epon or Araldite resins. Although the use of these polybasic carboxylic acids or anhydrides gives useful products, nevertheless there are certain disadvantages inherent in using such materials. In the first place, the shelf life of the partially reacted mixture of the ethoxyline resin and the polycarboxylic acid or anhydride is unsatisfactory, and after relatively short periods of time it is found that the mixture tends to advance in the state of cure so that if not employed within a reasonable time after addition of the acid or anhydride, the mixture becomes useless for most applications. As a further disadvantage of the use of these anhydrides as cure accelerators, it is found that when incorporated in the ethoxyline resin and the mixture is used in the form of thin films, there is a great tendency to lose the cure accelerator by vaporization when the films are heated at elevated temperatures of the order of from 150° to 200° C. which are the temperatures generally required to effect curing of the film. This loss of the cure accelerator results in a variable composition and impaired physical properties in the cured resin.

I have now discovered that mixtures of the aforementioned ethoxyline resins may be prepared which are eminently useful in many applications and which have properties which are superior in many respects to the properties of mixtures of ethoxyline resins heretofore prepared and used for the same purpose. More particularly, I have found that the combination of an ethoxyline resin together with an oil-modified acidic polyester reaction product having from 1 to 2 free carboxyl groups per molecule and obtained by reacting a trihydric alcohol ester with a long-chain (i. e., higher) fatty acid containing at least two unesterified alcoholic hydroxyl groups with a dicarboxylic acid or anhydride has properties which obviate the difficulties heretofore encountered using a polybasic carboxylic acid or anhydride as a cure accelerator for ethoxyline resins. The mixture of the oil-modified acidic polyester and the ethoxyline resin even in the partially reacted state can be stored at room temperatures for long periods without harming unduly their properties of solubility or fusibility, whereas resins prepared from the ethoxyline resins using the anhydrides alone as the cure accelerators become substantially infusible and insoluble in relatively short periods of time. Moreover, the heat-reacted resinous compositions prepared in accordance with my invention are much more flexible, tougher, and have greater impact strength than the heat-reacted ethoxyline resins (using, e. g., phthalic anhydride as a cure accelerator) described above, and have improved adhesion to metals and glass and are resistant to a greater variety of solvents than are resins of comparable flexibility. Finally, my claimed compositions of matter, particularly the partially condensed products obtained by effecting reaction between the oil-modified acidic polyester and the ethoxyline resin, are soluble in a larger number of less expensive solvents, including toluene and xylene, than are the ethoxyline resins heretofore known.

What is more surprising and unexpected is the fact that the compositions of matter herein described and claimed have a minimum power factor at 60° C. which is the operating temperature of a great number of types of electrical equipment. Generally it is found that organic insulations give increasingly higher power factors as the temperature increases.

The acidic oil-modified polyesters employed in the practice of this invention are not to be confused with the usual oil-modified alkyd resins generally employed, since the latter are not equivalent when used in combination with ethoxyline resins. The usual oil-modified alkyd resin does not have the proper acidity to be used satisfactorily with the ethoxyline resins so as to give equivalent results. Moreover, the usual oil-modified alkyd resins contain unreacted hydroxyl groups in a concentration approximately equivalent to the concentration of unreacted carboxyl groups. Contrasted to this, the oil-modified acidic polyesters employed in the practice of my invention are formulated with an equivalent excess of carboxyl groups. Since these polyesters are reacted essentially to completion, few if any hydroxyl groups remain unreacted. The excess carboxyl groups remain unreacted but attached to the polyester molecules. Glyceryl phthalate alkyd resins, although having measurable acid numbers, are unsuitable because of the undesirably large concentration of free hydroxyl groups.

In the preparation of the acidic oil-modified polyesters, various trihydric alcohols may be employed. Among such alcohols may be mentioned, for example, glycerol, pentaerythritol, polyglycerols, dipentaerythritol, etc. Examples of dicarboxylic acids or anhydrides containing no polymerizable unsaturation which may be used in making the aforesaid polyesters are, for instance, succinic, adipic, sebacic, phthalic, isophthalic, terephthalic, chlorinated phthalic, etc., acids or anhydrides. Where desired or possible, anyhdrides of the aforesaid acids may be employed with equal effect. For purposes of brevity throughout the specification and claims, the term "dicarboxylic acid" is intended to include not only the acid per se but anhydrides of the aforesaid acids which are capable of preparation.

The ethoxyline resins defined above as being a complex epoxide resin comprising a polyether derivative of a polyhydric organic compound containing epoxy groups are disclosed in various places in the art. Among such references may be mentioned the aforesaid Castan Patent 2,324,483 as well as Castan Patent 2,444,333, British Patents 518,057 and 579,698. For the most part, these ethoxyline resins are based on the resinous products of reaction between an epihalogenohydrin, for instance, epichlorohydrin, and a phenol having at least two phenolic hydroxyl groups, for example, bis-(4-hydroxyphenyl) dimethylmethane which is also called bis-(4-hydroxyphenyl)-2,2-propane. U. S. Patents 2,494,295, 2,500,600, and 2,519,130 describe additional examples of ethoxyline resinous compositions which may be employed in the practice of the present invention. By reference the aforementioned patents are intended to be made part of the present description of the ethoxyline resins used and for brevity the ethoxyline resins will not be described other than that they contain more than one ethylene oxide group, e. g., from 1 to 2 or more epoxide groups per molecule, and may be prepared by effecting reaction between a polyhydric phenol or alcohol, for example, phenol, hydroquinone, resorcinol, glycerine, and condensation products of phenols with ketones, for instance, bis-(4-hydroxyphenyl)-2,2-propane, with epichlorohydrin. For example, the reaction of epichlorohydrin with bis-(4-hydroxyphenyl)-2,2-propane may be formulated as follows:

around 0 to about 7. Many of these ethoxyline resins are sold under the name of Epon resins by Shell Chemical Corp., or as Araldite resins by the Ciba Co. Data on the Epon resins are given in the table below:

TABLE I

| Epon No. | Epoxide Equivalent | Approximate Esterification Equivalent | M. P., ° C. |
|---|---|---|---|
| RN–34 | 225–290 | 105 | 20–28. |
| RN–48 | 192 | 80 | 9. |
| 1064 | 300–375 | 105 | 40–45. |
| 1062 | 140–165 | | Liquid. |
| 1004 | 905–985 | 175 | 97–103. |
| 1007 | 1,600–1,900 | 190 | 127–133. |
| 1009 | 2,400–4,000 | 200 | 145–155. |
| 1001 | 450–525 | 130 | 64–76. |

The complex epoxides used with the above-described oil-modified acidic polyesters contain epoxide groups or epoxide and hydroxyl groups as their functional groups and are generally free from other functional groups such as basic and acidic groups.

Various methods may be used to prepare the acidic oil-modified polyesters employed with the ethoxyline resins. As will be apparent to persons skilled in the art, the oil-modified polyester may be preformed. For example, one may employ an oil-modified polyester such as glyceryl monoricinoleate as a preformed oil-modified polyester and thereafter react it with the dicarboxylic acid or anhydride to give the oil-modified acidic polyester. Instead of using preformed oil-modified polyesters, I may also effect reaction between the polyhydric alcohol, that is, the trihydric alcohol, for instance, glycerine, pentaerythritol, etc., with long-chain fatty acids in the presence of the dicarboxylic acid wherein chemical interaction between all the ingredients takes place to give the oil-modified acidic polyester. In general, I prefer to use preformed trihydric alcohol esters of long-chain fatty acids wherein the ester has at least two unesterified hydroxyl groups of the trihydric alcohol. The latter may be prepared externally by reacting the trihydric alcohol with an oil acid.

In order to prepare the oil-modified acidic polyesters described above which should have at least one free carboxyl group per molecule and at most two such free carboxyl groups per molecule, I may use any one of the various vegetable, animal, and synthetically produced oily modifying substances, either saturated or unsaturated, which can undergo ester exchange with a trihydric alcohol, which also includes tetrahydric alcohols. Among such oily modifying substances may be mentioned those selected from the class consisting of non-drying oils, semi-drying oils, drying oils, fatty oil acids, and mixtures thereof. Examples of such modifying substances (in the raw, heated, or blown state) are, for example, raw castor oil, dehydrated castor oil, linseed oil, coconut oil fatty acids, fatty acid glycerides, etc. Additional examples of oily modifying substances which can be employed are more particu-

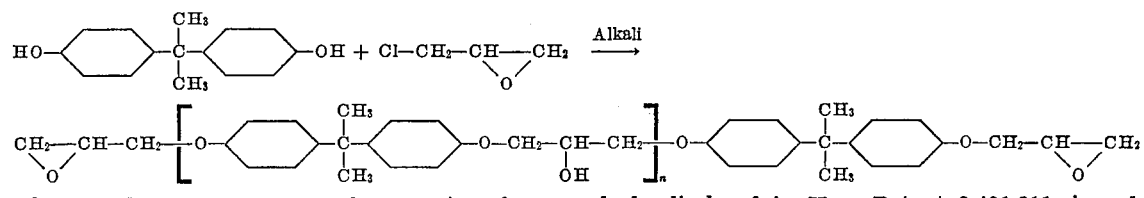

where $n$ has an average value varying from larly disclosed in Ham Patent 2,491,811, issued December 20, 1949 and assigned to the same assignee as the present invention. In the case of raw castor oil, an additional point of reaction is found in the hydroxyl group attached to the fatty acid chain. When reaction is effected between the preformed trihydric alcohol ester of a long-chain fatty acid, and the dicarboxylic acid or anhydride, for example, phthalic anhydride, I have found it expedient to use more than one mol of the dicarboxylic acid or anhydride per mol of the trihydric alcohol ester mentioned above. Obviously, if one hydroxyl group of pentaerythritol is esterified, it will be necessary to use at least 1.5 mols of the dicarboxylic acid, for example, phthalic anhydride, because of the three free residual hydroxyl groups. Generally, the upper limit of the mols of dicarboxylic acid or anhydride is about two mols thereof for two free hydroxyl groups in the trihydric alcohol ester of the long-chain fatty acid and three mols of the dicarboxylic acid or anhydride if there are three free hydroxyl groups in the trihydric alcohol ester of the long-chain fatty acid, for instance, the monoester reaction product of soya fatty acids and pentaerythritol. The maximum amount of dibasic acid or anhydride which is generally used for optimum results is one mol of the latter per hydroxyl equivalent. Stated alternatively, the upper limit of the number of mols of dibasic acid or anhydride per mol of the trihydric alcohol ester is equal to the number of hydroxyl groups of the ester remaining unesterified. For each hydroxyl group the amount of anhydride to be taken is more than ½ mol and not more than 1 mol.

When preparing the oil-modified acidic polyester using the preformed trihydric alcohol esters of long-chain fatty acids described above, it is desirable to heat the aforesaid trihydric alcohol ester with the dicarboxylic acid anhydride to temperatures ranging from about 150 to 225° C. for relatively short periods of time in order to effect esterification of the hydroxyl groups and the carboxyl groups. The time within which this heating may be conducted may, of course, vary depending on the temperatures employed and the reactants used. Generally, times ranging from about 10 minutes to 1 hour are sufficient to give the oil-modified acidic polyester rich in carboxyl groups required for the practice of the present invention.

When preparing the acidic oil-modified polyester using the various vegetable, animal or synthetically produced oils (which are oil acids per se or will undergo ester exchange with the polyhydric alcohol) in combination with the trihydric alcohol and the dicarboxylic acid so as to form the trihydric alcohol ester of the long-chain fatty acid in situ, precautions should be observed so that the final acidic oil-modified polyester is carboxyl-rich as described previously. In addition, essentially all the free hydroxyl groups of the trihydric alcohol should be esterified either by the long-chain fatty acids or by reaction with the dicarboxylic acid or anhydride which should be present in an amount equivalent to esterify all such free hydroxyl groups.

When using the dicarboxylic acid with a glyceryl ester of a long-chain fatty acid in which there are present 2 unesterified hydroxyl groups, I advantageously employ for each mol of the aforesaid ester from about 1.1 to 2.0, preferably from 1.5 to 2.0 mols, of the dicarboxylic acid. In the case of polyhydric alcohols, such as pentaerythritol, containing three unesterified hydroxyl groups as a result of the formation of the trihydric alcohol ester of long-chain fatty acids, it has been found that for each mol of such a polyester, from about 2.2 to 3.0 mols, preferably from 2.5 to 3.0 mols, of the dicarboxylic acid may be used.

When preparing the polyesters it is desirable for many applications that the acid number of the polyesters exceed 10. Of course, the acid number may be varied by varying the type of polyester prepared and generally I prefer to use acid numbers ranging from about 20 to 200. Lower acid numbers in the acidic oil-modified polyester require ethoxyline resins of higher equivalent to keep the ratio of polyester to ethoxyline resin constant.

These oil-modified polyesters are prepared as described above by heating the proper mixture of ingredients in the requisite molar concentrations at elevated temperatures of the order of about 150° to 250° C. for varying lengths of time until the acid number is within the desired range and most of the hydroxyl groups have been esterified by the dicarboxylic acid to give the acidic oil-modified polyesters desired for use with the ethoxyline resins.

The proportion of oil-modified acidic polyester and ethoxyline resin employed may be varied within limits, depending on the application for which the mixture is intended, the type of polyester used, the type of ethoxyline resin employed, etc. Generally, I prefer to use the acidic polyester in an amount ranging from about 5 to 70% of the total weight of the ethoxyline resin and the oil-modified acidic polyester, the actual proportion of the ingredients depending upon the specific oil-modified polyester and ethoxyline resin employed. Generally, there should be present from 1 to 2, preferably from 1.1 to 1.8 epoxide equivalents per carboxyl equivalent in the oil-modified polyester. In some applications, I have found that on a weight basis I may use as low as 0.05 to 9 parts of the ethoxyline resin per part of the oil-modified acidic polyester. The actual ratio of the polyester to the ethoxyline resin will, of course, depend on the equivalent weight of the ethoxyline resin which can be varied within fairly wide limits, as will be apparent from reference to Table I. Stated alternatively, I may use at least 90 weight percent of the quantity of oil-modified polyester required to esterify each epoxide equivalent of epoxide resin and I may use as high as 100 percent of the quantity of oil-modified polyester required to completely esterify the ethoxyline resin including epoxide groups and aliphatic hydroxyl groups. The higher the molecular weight of the ethoxyline resin, the greater are the number of hydroxyl groups which will be present. It should be noted that the proportions of the oil-modified acidic polyester and the ethoxyline resin used are in some respects fairly critical depending on the type of polyester used which, of course, will vary depending on the number of free carboxyl groups.

The method by which the oil-modified acidic polyester and the ethoxyline resin may be combined can, of course, be varied and presents no particular difficulty. Generally, it is desirable to heat the oil-modified polyester together with the ethoxyline resin at a temperature of from about 75° to 150° C. and when it reaches the higher temperature, for example, around 140° C., generally it is sufficient to shut off the heat and permit the reaction to continue under its own exothermic heating. The duration of intercondensation is short and heating under such circumstances will require short periods of time of the order of about 5 to 30 minutes. There is thus obtained an intercondensed product which can be used for various applications and when so used can be heat-treated later at temperatures of the order of about 125° to 250° C. without the use of other cure accelerators or other modifying agents to give final products which are thermoset and substantially infusible and insoluble. The flexibility of such materials in the finally cured state is outstanding and the adhesion to metals, for example, aluminum, is much better than other organic coating materials of similar or equivalent flexibility. Of course, instead of stopping the reaction in an intermediate state, it may also be desirable to form a mixture of the oil-modified acidic polyester and the ethoxyline resin and use that for coating or other applications and effect intercondensation and final conversion to the thermoset and infusible and insoluble state in situ in the application for which the mixture of resins is intended.

In order that those skilled in the art may better understand how the present invention may be practiced, the following examples are given by way of illustration and not by way of limitation. All parts are by weight.

Example 1

Into a reaction vessel equipped with a stirrer, thermometer, and reflux condenser were added 364 parts glyceryl monoricinoleate (1 mol) containing small amounts of the diricinoleate and triricinoleate and 251 parts phthalic anhydride (1.7 mols). This mixture was heated with stirring to 220° C. and held at around this temperature for approximately 10 minutes. Thereafter, the material was immediately placed in a cool reaction vessel in order to quench further reaction. The product thus obtained was a clear, dark, viscous liquid, had an acid number of about 161 which corresponds to a carboxyl equivalent of about 350. This product was a castor oil-modified acidic polyester rich in carboxyl groups.

Example 2

About 35 parts of the oil-modified acidic polyester prepared in Example 1 was mixed with 26.8 parts of an ethoxyline resin, specifically, Epon Resin RN-34, and stirred together at about 85° C. until both phases were fluid. The mixture was then heated to 110° C. at which time the reaction mass became clear and appeared to be homogeneous. Heating was continued up to about 160° C. which took approximately 20 minutes. At the end of this time the mass thus obtained was clear, and when a drop was removed therefrom and placed on a cool surface became hard and transparent. The resinous mixture thus obtained was cooled and formed into a 50% solids toluene solution.

Aluminum strips were dipped in the resinous solution described above in Example 2 and cured for 3 hours at 150° C. At the end of this time it was found that the film on the aluminum was flexible, tough and tenaciously adherent thereto. The resinous film was cross-linked and was essentially infusible and insoluble in most solvents.

It will, of course, be apparent to those skilled in the art that instead of using the performed glyceryl monoricinoleate employed in Example 1 in the preparation of the oil-modified acidic polyester, other trihydric alcohol esters of long-chain fatty acids, for instance, the monoester reaction product of soya fatty acids and pentaerythritol may also be reacted with the same or different dicarboxylic acids or anhydrides without departing from the scope of the invention. The monoesters of the trihydric alcohol may also contain small amounts of the higher esterified products including the diester, the triester, and even the tetraester in the case of pentaerythritol. The monoester is generally prepared by effecting reaction between 1 mol of the trihydric alcohol and 1 mol of the modifying oil material, for instance, the fatty oil acids. Alternatively, instead of using the preformed trihydric alcohol ester long-chain fatty acid, the acidic oil-modified polyester may be prepared in situ by mixing the trihydric alcohol containing at least three aliphatic hydroxyl groups, for example, glycerine or pentaerythritol, with various oil acids and the dicarboxylic acid to form the oil-modified acidic polyester. Many examples of fatty oil acids or dicarboxylic acids or anhydrides or trihydric alcohol esters of long-chain fatty acids have been given previously and may be substituted for those employed in the examples described above. Moreover, instead of using the particular ethoxyline resin described above, other ethoxyline resins, many examples of which are given in Table I, may be used with essentially equivalent results.

Persons skilled in the art will recognize that the conditions for effecting or preparing the oil-modified acidic polyester as well as the conditions for effecting reaction between the oil-modified acidic polyester and the ethoxyline resin may also be varied and does not present any difficulty in this respect. Persons skilled in the art will be able to carry out these reactions by observing the directions heretofore given and by referring to other disclosures and teachings in the copending application of William E. Cass, Serial No. 254,207, filed concurrently herewith and assigned to the same assignee as the present invention. The proportions of the oil-modified acidic polyester and the ethoxyline resin may also be varied within the limits described previously.

The compositions of matter herein disclosed and claimed may be used in various applications, for instance, as coating materials for various surfaces including metallic surfaces to which they adhere quite tenaciously. In addition, the mixtures of the oil-modified acidic polyester and the ethoxyline resin either as a mixture per se or in the partially condensed state, as is more particularly described in Example 2, may be used to coat electrical conductors, for example, metal conductors such as copper, aluminum, silver, etc., to give an insulation of good heat resistance and flexibility, and yet possessing, in many respects, electrical properties suitable for many insulating purposes. If desired, various porous cloths, such as glass fiber cloth, asbestos cloth, etc., may be coated and impregnated with the resinous compositions herein described and used as insulating materials. A still further application for the resinous compositions of my invention is for use in molding materials since they can be mixed with various fillers such as lithopone, ferric oxide, wood flour, asbestos floats, glass fibers, titanium dioxide, etc., and molded under heat and pressure to give useful objects. Alternatively, solutions of the resins herein described may be used to coat and impregnate various sheet materials, for example, paper, cloth, glass fiber cloth, asbestos cloth, etc., the sheets superposed upon each other and cured under heat and pressure to give laminates of good strength and electrical properties.

The compositions herein described and claimed may also be used as deep curing, casting and potting materials having suitability in the electrical manufacturing and insulating art. The aforementioned compositions either in the partially condensed state or as a simple mixture of ingredients can be employed in adhesive applications wherein various surfaces can be adhered to each other with good bonding by the application of heat and pressure.

It has also been found that the partially intercondensed product obtained by effecting reaction between the oil-modified acidic polyester and the ethoxyline resin may be cured more thoroughly and faster by incorporating in the aforesaid partially condensed material small amounts of soluble metal salts of organic acids. These metal salts of organic acids, which are generally known as "metal driers," may comprise from about 0.05 to about 5 per cent, by weight, preferably from about 0.5 to 2 per cent, by weight, based on the weight of the intercondensed product. Examples of such metal salts are, for example, lead octoate, lead naphthenate, cobalt naphthenate, manganese naphthenate, etc. Generally, I have found that improved results are obtained when mixtures of such driers or metallic salts of organic acids are employed with the intercondensed product.

To illustrate the effect of using the aforementioned metallic salts of organic acids as cure accelerators for the intercondensed products described above, the solution of the intercondensed composition described in Example 2 in which ethoxyline resin Epon RN-34 was interacted with the oil-modified acidic polyester prepared in Example 1, was divided into three portions. To one portion was added, by weight, based on the weight of the intercondensed product 0.5 per cent lead naphthenate and 0.05 per cent cobalt naphthenate. To the second portion of the intercondensed product was added, by weight, 0.5 per cent lead naphthenate, 0.05 per cent cobalt naphthenate and 0.02 per cent manganese naphthenate. A third sample which was used as a control contained no added catalyst. Steel strips about 3" x 5" were dipped in the various catalyzed products described above as well as in the non-catalyzed material and these coated strips were baked at 150° C. for varying lengths of time. The hardness of each resinous film was measured after each baking cycle with the results described in Table II below.

TABLE II

| Minutes at 150° C. | Sward Hardness | | |
|---|---|---|---|
| | No Catalyst | Lead and Cobalt Naphthenates | Lead, Cobalt, Manganese Naphthenate |
| 30 | 6 | 8 | 22 |
| 60 | 10 | 20 | 32 |
| 90 | 14 | 20 | 38 |
| 120 | 12 | 24 | 44 |
| 150 | 12 | 32 | 48 |
| 180 | 14 | 38 | 58 |

The coated and heat-treated metal strips were also tested for the effects thereon when immersed in water and for their oil resistance, particularly in connection with their oil resistance to 10C. Transil oil for 72 hours. The results showed that the catalyzed resin containing the lead, cobalt and manganese naphthenates had the best water resistance of the three samples after a one hour bake at 150° C. The sample containing no catalyst showed up the poorest in the water immersion test. The two samples containing the mixture of metallic naphthenates showed less softening when immersed in the Transil oil than the sample which contained no catalyst at all.

The metallic salts of organic acids mentioned above for use with the partially condensed products are more particularly described in Welsh Patent 2,459,572 issued September 21, 1948, and assigned to the same assignee as the present invention.

What I claim as new and desire to secure by Letters Patent of the United States is:

1. The product of reaction under heat of a mixture of ingredients consisting essentially of (1) an oil-modified acidic polyester substantially free of alcoholic hydroxyl groups and having an acid number of from 20 to 200 and containing from 1 to 2 free carboxyl groups per molecule, the said polyester having been obtained by effecting reaction between a mixture of ingredients consisting essentially of (a) a trihydric alcohol ester of a long chain monocarboxylic fatty acid containing at least two unesterified alcoholic hydroxy groups and (b) a dicarboxylic acid free of polymerizable unsaturation, there being present in the reaction mixture more than one mol of the dicarboxylic acid per mol of trihydric alcohol ester, any unsaturation in the acidic polyester being due solely to the aforesaid monocarboxylic acid used to make the trihydric alcohol ester, and (2) a complex epoxide resin containing epoxy groups and comprising a polyether derivative obtained by reacting epichlorohydrin with a polyhydric organic compound selected from the class consisting of polyhydric alcohols and phenols containing at least two phenolic hydroxy groups, there being present in the aforesaid complex epoxide resin from one to two epoxide equivalents per carboxyl equivalent in the acidic oil-modified polyester, the acidic polyester comprising, by weight, from 5 to 70 per cent of the total weight of the latter and the epoxide resin.

2. The product of reaction under heat of a mixture of ingredients consisting essentially of (1) an oil-modified acidic polyester substantially free of alcoholic hydroxyl groups and having an acid number of from 20 to 200 and containing from 1 to 2 free carboxyl groups per molecule, the said polyester having been obtained by effecting reaction between a mixture of ingredients consisting essentially of (a) glyceryl monoricinoleate containing two unesterified alcoholic hydroxy groups and (b) a dicarboxylic acid free of polymerizable unsaturation, there being present in the reaction mixture more than one mol of the dicarboxylic acid per mol of glyceryl monoricinoleate, and (2) a complex epoxide resin containing epoxy groups and comprising a polyether derivative obtained by reacting epichlorohydrin and a polyhydric phenol containing at least two phenolic hydroxy groups, there being present in the aforesaid complex epoxide resin from one to two epoxide equivalents per carboxyl equivalent in the acidic oil-modified polyester, the aforesaid acidic polyester comprising, by weight, from 5 to 70 per cent of the total weight of the latter and the epoxide resin.

3. The product of reaction under heat of a mixture of ingredients consisting essentially of (1) an oil-modified acidic polyester substantially free of alcoholic hydroxyl groups and having an acid number of from 20 to 200 and containing from 1 to 2 free carboxyl groups per molecule, the said polyester having been obtained by effecting reaction between a mixture of ingredients consisting essentially of (a) a monoester reaction product of soya fatty acids and pentaerythritol in which said monoester contains at least two unesterified alcoholic hydroxy groups, and (b) a dicarboxylic acid free of polymerizable unsaturation, there being present in the reaction mixture more than one mol of the dicarboxylic acid per mol of the aforesaid monoester, and (2) a complex epoxide resin containing epoxy groups and comprising a polyether derivative obtained by reacting epichlorohydrin with a polyhydric organic compound selected from the class consisting of polyhydric alcohols and phenols containing at least two phenolic hydroxy groups, there being present in the aforesaid complex epoxide resin from 1 to 2 epoxide equivalents per carboxyl equivalent in the acidic oil-modified polyester, the aforesaid acidic polyester comprising, by weight, from 5 to 70 per cent of the total weight of the latter and the epoxide resin.

4. The product of reaction under heat of a mixture of ingredients consisting essentially of (1) an oil-modified acidic polyester substantially free of alcoholic hydroxyl groups and having an acid number of from 20 to 200, and containing from 1 to 2 free carboxyl groups per molecule, the said polyester having been obtained by effecting reaction between a mixture of ingredients consisting essentially of (a) glyceryl monoricinoleate containing two unesterified alcoholic hydroxy groups and (b) phthalic anhydride, there being present in the reaction mixture more than one mol of the phthalic anhydride per mol of glyceryl monoricinoleate, and (2) a complex epoxide resin containing epoxy groups and comprising a polyether derivative obtained by reacting epichlorohydrin with a phenol containing at least two phenolic hydroxy groups, there being present in the aforesaid complex epoxide resin from 1 to 2 epoxide equivalents per carboxyl equivalent in the acidic oil-modified polyester, the aforesaid acidic polyester comprising, by weight, from 5 to 70 per cent of the total weight of the latter and the epoxide resin.

5. The product of reaction of a mixture of ingredients consisting essentially of (1) an oil-modified acidic polyester substantially free of alcoholic hydroxyl groups and having an acid number of from 20 to 200 and containing from 1 to 2 free carboxyl groups per molecule, the said polyester having been obtained by effecting reaction between a mixture of ingredients consisting essentially of (a) the monoester reaction product of soya fatty acids and pentaerythritol and containing at least two unesterified alcoholic hydroxy groups, and (b) phthalic anhydride, there being present in the reaction mixture more than one mol of the phthalic anhydride per mol of the aforesaid monoester reaction product, and (2) a complex epoxide resin containing epoxy groups and comprising a polyether derivative obtained by reacting epichlorohydrin with a phenol containing at least two phenolic hydroxy groups, there being present in the aforesaid complex epoxide resin from 1 to 2 epoxide equivalents per carboxyl equivalent in the acidic oil-modified polyester, the aforesaid acidic polyester comprising, by weight, from 5 to 70 per cent of the total weight of the latter and the epoxide resin.

6. The heat-converted product of claim 1.
7. The heat-converted product of claim 4.

References Cited in the file of this patent

UNITED STATES PATENTS

| Number | Name | Date |
|---|---|---|
| 2,324,483 | Castan | July 20, 1943 |
| 2,591,539 | Greenlee | Apr. 1, 1952 |
| 2,626,223 | Sattler et al. | Jan. 20, 1953 |

OTHER REFERENCES

Shell, Paint Oil and Chem. Rev., November 9, 1950, pp. 15–18, 48 and 49.

Cyanamid Resins for Specification Finishes; Amer. Cyanamid Co., 1943, page 12.

Synthetic Resins for Coatings; Resinous Products and Chemical Co., 1947, p. 42.

Paint Oil and Chem. Review, November 9, 1950, pages 15–18, 48 and 49.